Feb. 6, 1923.

J. F. O'CONNOR.
FRICTION SHOCK ABSORBING MECHANISM.
FILED JAN. 30, 1922.

1,444,553.

2 SHEETS—SHEET 1.

Witnesses
Wm. Geiger

Inventor
John F. O'Connor
By Geo. J. Haight
His Atty.

Feb. 6, 1923.
J. F. O'CONNOR.
FRICTION SHOCK ABSORBING MECHANISM.
FILED JAN. 30, 1922.
1,444,553.
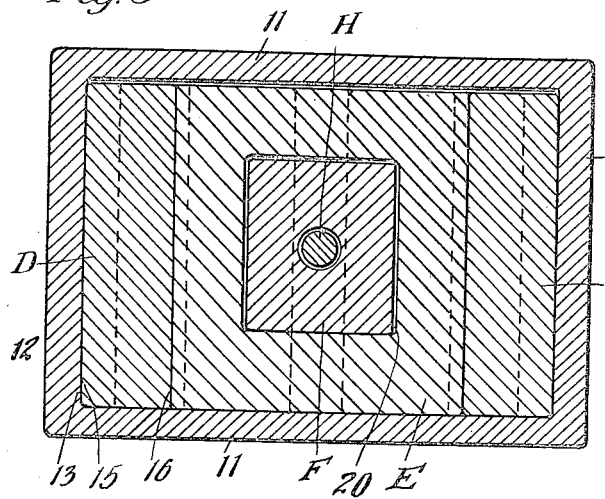
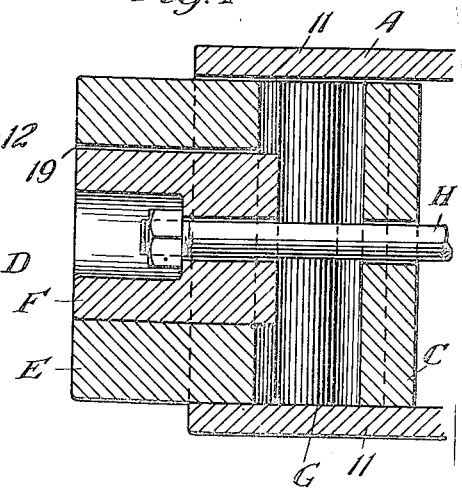
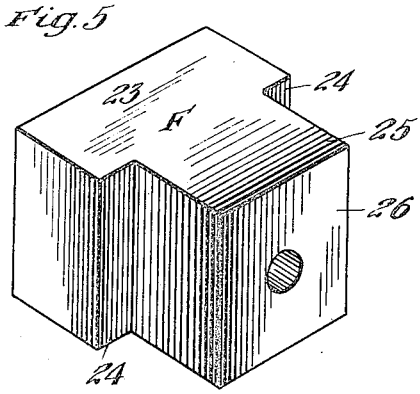
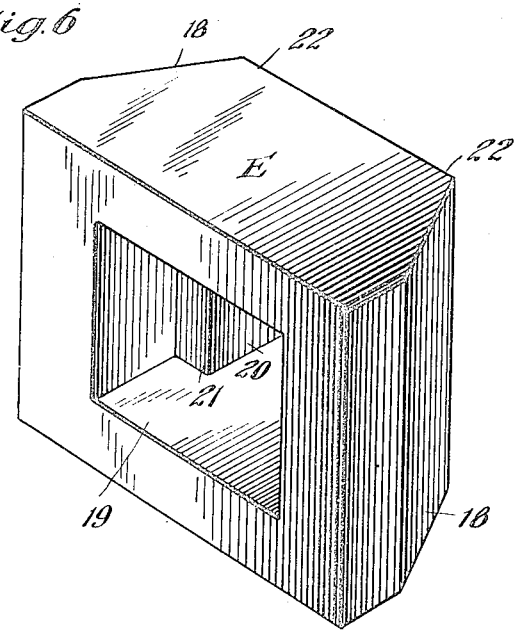
Witnesses
Wm. Geiger
Inventor
John F. O'Connor
By Geo. J. Haight
His Atty.

Patented Feb. 6, 1923.

1,444,553

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed January 30, 1922. Serial No. 532,614.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism of efficient and economical design wherein are obtained high capacity and certain release, the mechanism being especially adapted for use in railway draft riggings.

Figure 1:
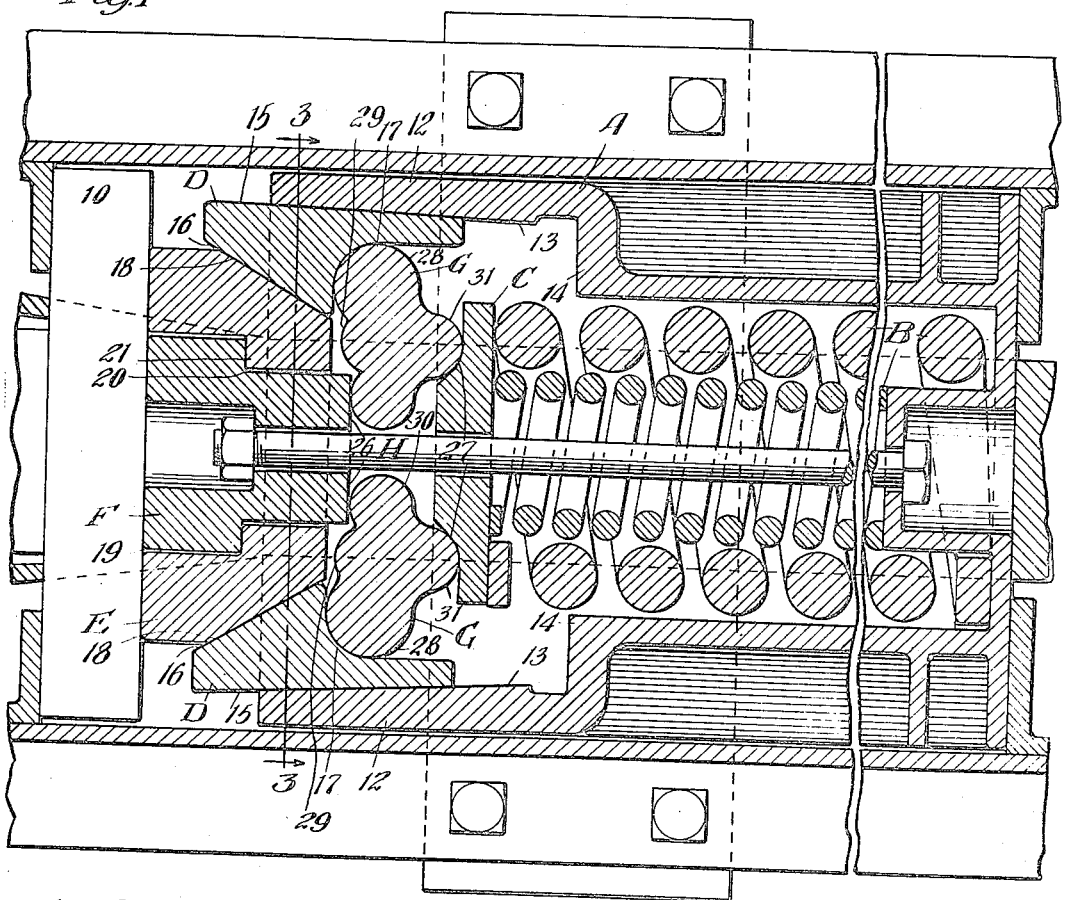
Figure 2:
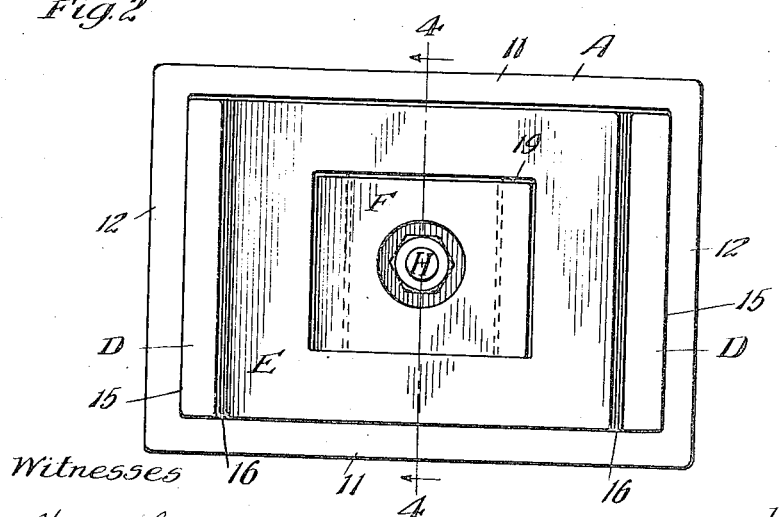

In the drawings forming a part of this specification, Figure 1 is a horizontal, longitudinal, sectional view, parts being broken away, of a portion of a railway draft rigging showing my improvements in connection therewith. Figure 2 is an outer end elevation of the shock absorbing mechanism proper shown in Figure 1. Figure 3 is a vertical, transverse sectional view of the shock absorbing mechanism proper corresponding substantially to the section line 3—3 of Figure 1. Figure 4 is a vertical, longitudinal, sectional view corresponding to the section line 4—4 of Figure 2. And Figures 5 and 6 are detail perspectives of a pressure-transmitting plunger and a wedge, respectively, employed in my improvements.

The improved shock absorbing mechanism is shown mounted in the usual manner between the draft sills and stop lugs of a car underframe, said mechanism being adapted to be operated in the usual manner by means of a drawbar and yoke. A front follower 10 is associated with the shock absorbing mechanism proper.

The improved shock absorbing mechanism proper, as shown, comprises a combined friction shell and spring cage casting A; a spring resistance B; a spring follower C; a pair of wedge-friction-shoes D—D; a wedge E; a pressure-transmitting plunger F; a pair of equalizing lever elements G—G; and a retainer bolt H.

The casting A is shown as having the friction shell proper at the outer or forward end thereof, the same being of substantially rectangular form, having top and bottom walls 11—11 and side walls 12—12, the latter being provided on their inner sides with longitudinally extending friction surfaces 13—13 which are preferably inwardly converged. At the inner ends of the friction surfaces 13, the side walls of the casting A are extended inwardly toward the center line, forming shoulders 14—14 and are thence extended rearwardly so as to provide for the centering of the spring resistance B. The rear end of the casting A is laterally extended in a well known manner so as to cooperate with the usual adjacent stop lugs as a rear follower.

The two wedge-friction-shoes D—D are of like construction and each is formed on the outer side with a longitudinally extending friction surface 15 and on the inner side with a wedge face 16. At the inner end of the wedge face 16, the shoe is shouldered and rounded so as to provide a curved bearing or fulcrum as indicated at 17, for the equalizing member G, hereinafter described.

The wedge E, best shown in Figures 1 and 6, is formed on the outer sides thereof with wedge faces 18—18 engaging and cooperating with the corresponding wedge faces 16 of the shoes. The wedge E is hollow, having a rectangular relatively large opening 19 at its outer end, the latter merging with a smaller rectangular opening 20 at the inner end, thus forming outwardly facing shoulders 21—21. The outer end of the wedge E normally bears against the front follower 10 as shown in Figure 1. Relatively narrow vertically extending shoulders 22—22 are formed at the inner end of the wedge E, said shoulders 22 being normally slightly spaced from the compensating elements G, as shown in Figure 1.

The pressure-transmitting block or plunger F, shown in Figure 5, has an outer section 23 fitting the opening 19 and provided with shoulders 24 which normally engage the shoulders 21 of the wedge E, when the outer ends of both the wedge and the plunger are flush and in engagement with the follower 10. Inwardly of the section 23, the plunger F is of reduced cross section as indicated at 25 to loosely fit within the opening 20 of the wedge E. The length of the section 25 of the plunger F is greater than the length of the opening 20 so that the inner end 26 of the plunger F is normally extended inwardly of the shoulders 22 of the wedge E, as shown in Figure 1.

The spring follower C, on the end of the spring adjacent the shoes and wedge, is formed on its outer face with a pair of curved bearing surfaces or fulcrums 27—27 for the lever elements G, one on each side of the center line of the mechanism.

The elements G are of like construction and each is shown as in the form of a rocker lever having what may be termed four coalesced or merged cylindrical sections 28, 29, 30 and 31. The cylindrical section 28 is adapted to rock or pivot on the bearing surface 17; the section 30 is adapted to similarly function on the inner end 26 of the plunger F; and the section 31 is adapted to similarly function on the bearing surface 27 of the spring follower C. Normally the cylindrical section 29 is out of engagement with any other member, as shown in Figure 1, but is adapted to bear upon the corresponding adjacent shoulder 22 of the wedge E during release, as hereinafter explained.

The parts are held in assembled relation by means of the retainer bolt H which is anchored at its rear end in a suitable hollow boss within the casting A and at its front end within the plunger F.

The operation is as follows, assuming an inward or buffing movement of the drawbar. As the follower 10 moves inwardly or to the right as viewed in Figure 1, the plunger F and wedge E are moved in the same direction simultaneously and uniformly, thus setting up a spreading or wedging action on the shoes D which is yieldingly resisted by the spring reacting through the follower C and lever elements G. During this action, part of the spring resistance is transferred in what may be designated a direct manner to the plunger F through the lever elements G. As will be obvious, any relative movement between the various parts of the friction-creating elements will be readily taken care of by the rocking movements of the elements G. At the end of the compression stroke and at the instant of removal of the actuating force, the friction between the wedge and shoes and between the shoes and the shell will obviously be at the maximum. By reason of this condition, after removal of the actuating force, the plunger F offers much less resistance to outward longitudinal movement than do the shoes and wedge and hence the spring is enabled to react through the spring follower C and lever elements G to force the plunger F outwardly relatively to the wedge until the cylindrical bearing sections 29 of the elements G engage with the inner end shoulders 22 of the wedge. During this action of the elements G, they are fulcrumed on the shoes. During this action, it will be evident that the front follower 10 and the drawbar will have been forced outwardly relatively to the rest of the mechanism, thereby relieving the wedge E of all appreciable outside resistance to its movement outwardly of the shell. Furthermore, as the elements G are moved to the point of engagement with the wedge E, part of the spring pressure will be directly transferred to the wedge E, thus facilitating the disengagement of the wedge from the shoes and permitting the friction elements to collapse. Upon collapse of the wedge and friction shoes, it is evident that all of the parts may be readily projected outwardly under the continued expansion of the spring until all of the parts have assumed their normal position as shown in Figure 1.

I claim:

1. In a friction shock absorbing mechanism, the combination with a friction shell having interior opposed friction surfaces; of a spring resistance; friction shoes slidable on said friction surfaces and each having a wedge face; a wedge cooperable with said shoes; a pressure-transmitting plunger; a follower for the spring resistance at the end thereof adjacent the shoes; and compensating levers, each having engagement with said follower, said plunger and a shoe.

2. In a friction shock absorbing mechanism, the combination with a friction shell having interior opposed friction surfaces; of a spring resistance; friction shoes slidable on said friction surfaces and each having a wedge face; a wedge cooperable with said shoes; a pressure transmitting plunger; a follower for the spring resistance at the end thereof adjacent the shoes; and compensating levers, each having engagement with said follower, said plunger and a shoe, said plunger being longitudinally movable relatively to the wedge and said levers adapted to engage said wedge during release.

3. In a friction shock absorbing mechanism, the combination with a friction shell having interior opposed friction surfaces; of a spring resistance; friction shoes slidable on said friction surfaces and each having a wedge face; a wedge cooperable with said shoes; a pressure-transmitting plunger; a follower for the spring resistance at the end thereof adjacent the shoes; and rocker levers each having pivotal bearing on the follower, plunger and a shoe.

4. In a friction shock absorbing mechanism, the combination with a friction shell having interior opposed friction surfaces; of friction shoes cooperable with said surfaces and each having a wedge face and a fulcrum forming bearing surface; a spring resistance; a wedge cooperable with said shoes; a pressure-transmitting plunger slidably mounted longitudinally with respect to the wedge; a spring follower; and compensating levers each having pivotal bearing contact with said spring follower, the inner end of the plunger and said fulcrum bearing surface of a shoe, said levers being normally out of contact with the wedge and adapted to engage with the latter during release action of the mechanism.

In witness that I claim the foregoing I have hereunto subscribed my name this 10th day of January, 1922.

JOHN F. O'CONNOR.

Witnesses:
   UNA C. GRIGSBY,
   ANN BAKER.